(12) United States Patent
Halbraich et al.

(10) Patent No.: US 8,165,114 B2
(45) Date of Patent: Apr. 24, 2012

(54) VOICE OVER IP CAPTURING

(75) Inventors: Eran Halbraich, Beit-Zayit (IL); Reuven Knoll, Modlin (IL); Leon Portman, Rishon-LeZion (IL); Yariv Lenchner, Petach-Tikva (IL); Gal Yachil, Givat Shmuel (IL)

(73) Assignee: Nice Systems Ltd., Raanana (IL)

( * ) Notice: Subject to any disclaimer, the term of this patent is extended or adjusted under 35 U.S.C. 154(b) by 1105 days.

(21) Appl. No.: 11/452,917

(22) Filed: Jun. 15, 2006

(65) Prior Publication Data

US 2006/0268847 A1 Nov. 30, 2006

Related U.S. Application Data

(63) Continuation-in-part of application No. 10/913,326, filed on Aug. 9, 2004, which is a continuation of application No. PCT/IL03/00109, filed on Feb. 12, 2003.

(60) Provisional application No. 60/387,925, filed on Jun. 13, 2002.

(51) Int. Cl.
*H04L 12/26* (2006.01)

(52) U.S. Cl. ........ 370/389; 370/401; 370/474; 370/475; 709/224; 709/245

(58) Field of Classification Search .......... 370/432, 370/217, 252–253, 469, 401–405; 379/35, 379/386; 713/201; 398/9; 709/224
See application file for complete search history.

(56) References Cited

U.S. PATENT DOCUMENTS

| | | | |
|---|---|---|---|
| 5,099,510 A | 3/1992 | Blinken et al. | |
| 5,101,402 A | 3/1992 | Chiu et al. | |
| 5,515,376 A * | 5/1996 | Murthy et al. | 370/402 |
| 5,559,875 A | 9/1996 | Bieselin et al. | |
| 5,710,591 A | 1/1998 | Bruno et al. | |
| 5,764,901 A | 6/1998 | Skarbo et al. | |
| 5,787,253 A | 7/1998 | McCreery et al. | |
| 5,841,977 A | 11/1998 | Ishizaki et al. | |
| 5,867,559 A | 2/1999 | Jorgensen et al. | |
| 5,893,053 A | 4/1999 | Trueblood | |

(Continued)

FOREIGN PATENT DOCUMENTS

EP 0 841 832 5/1998

(Continued)

OTHER PUBLICATIONS

??? "Series H: Audiovisual and Multimedia Systems. Infrastructure of Audiovisual Services —Systems and Terminal Equipment for Audiovisual Services. Packet-Based Multimedia Communications Systems", International Telecommunication Union (ITU), ITU-T Recommendation H.323, 562 P., 1998.

(Continued)

*Primary Examiner* — Kwang B Yao
*Assistant Examiner* — Jeffrey M Rutkowski
(74) *Attorney, Agent, or Firm* — Pearl Cohen Latzer, LLP

(57) ABSTRACT

An apparatus for Voice over IP capturing in a network, comprising: a data receiver, tapping the network and configured to receive at least one data packet transmitted in the network, a VoIP identifier, associated with the data receiver, configured to determine if the received data packet is a VoIP data packet qualifying for forwarding to a capture device, and a forwarder, associated with the VoIP identifier, configured to forward a copy of the qualifying VoIP data packet to at least one capture device, and to forward the received data packets back to the network.

25 Claims, 15 Drawing Sheets

U.S. PATENT DOCUMENTS

| | | | |
|---|---|---|---|
| 5,963,913 | A | 10/1999 | Henneuse et al. |
| 5,978,835 | A | 11/1999 | Ludwig et al. |
| 6,006,253 | A | 12/1999 | Kumar et al. |
| 6,108,782 | A | 8/2000 | Fletcher et al. |
| 6,122,665 | A | 9/2000 | Bar et al. |
| 6,181,784 | B1 | 1/2001 | Duran et al. |
| 6,311,231 | B1 | 10/2001 | Bateman et al. |
| 6,480,584 | B2 | 11/2002 | Duran et al. |
| 6,490,344 | B1 | 12/2002 | Murai et al. |
| 6,504,907 | B1* | 1/2003 | Farris et al. ............ 379/35 |
| 6,535,909 | B1 | 3/2003 | Rust |
| 6,542,602 | B1 | 4/2003 | Elazar |
| 6,549,516 | B1 | 4/2003 | Albert et al. |
| 6,553,025 | B1 | 4/2003 | Kung et al. |
| 6,574,335 | B1* | 6/2003 | Kalmanek et al. ........ 379/386 |
| 0,200,311 | A1 | 10/2003 | Baum |
| 6,647,020 | B1* | 11/2003 | Maher et al. ............ 370/432 |
| 6,661,879 | B1 | 12/2003 | Schwarts et al. |
| 6,839,323 | B1 | 1/2005 | Foti |
| 6,876,633 | B2 | 4/2005 | Strathmeyer et al. |
| 6,940,835 | B2* | 9/2005 | Reza et al. ............. 370/401 |
| 6,985,440 | B1 | 1/2006 | Albert et al. |
| 7,010,106 | B2 | 3/2006 | Gritzer et al. |
| 7,046,663 | B1* | 5/2006 | Temoshenko et al. ..... 370/390 |
| 7,055,174 | B1 | 5/2006 | Cope et al. |
| 7,068,598 | B1* | 6/2006 | Bryson et al. ........... 370/401 |
| 7,286,652 | B1* | 10/2007 | Azriel et al. ............ 709/224 |
| 7,305,082 | B2 | 12/2007 | Elazar et al. |
| 2001/0052081 | A1* | 12/2001 | McKibben et al. ....... 713/201 |
| 2002/0006187 | A1 | 1/2002 | Lukas |
| 2002/0027977 | A1 | 3/2002 | Noguchi |
| 2002/0116464 | A1 | 8/2002 | Mak |
| 2003/0007486 | A1* | 1/2003 | March et al. ............ 370/389 |
| 2003/0095567 | A1* | 5/2003 | Lo et al. ............... 370/474 |
| 2003/0107991 | A1 | 6/2003 | Tezuka et al. |
| 2003/0142805 | A1 | 7/2003 | Gritzer et al. |
| 2003/0219025 | A1* | 11/2003 | Choi et al. ............. 370/217 |
| 2004/0141594 | A1 | 7/2004 | Brunson et al. |
| 2004/0165709 | A1 | 8/2004 | Pence et al. |
| 2004/0228627 | A1* | 11/2004 | Alana et al. ............ 398/9 |
| 2005/0094651 | A1 | 5/2005 | Lutz et al. |
| 2005/0141691 | A1 | 6/2005 | Wengrovitz |
| 2005/0175156 | A1* | 8/2005 | Afshar et al. ........... 379/35 |
| 2005/0240656 | A1* | 10/2005 | Blair .................. 709/224 |
| 2006/0029062 | A1 | 2/2006 | Rao et al. |
| 2006/0107310 | A1 | 5/2006 | Schmid et al. |

FOREIGN PATENT DOCUMENTS

| | | |
|---|---|---|
| EP | 0902569 | 3/1999 |
| EP | 1512263 | 9/2003 |
| WO | WO 99-46702 | 9/1999 |
| WO | WO 01/60027 | 8/2001 |
| WO | WO 01/91374 | 11/2001 |
| WO | WO 02/17036 | 2/2002 |
| WO | WO 02/19620 A2 | 3/2002 |

OTHER PUBLICATIONS

International Search Report for International Application No. PCT/IL2007/000111. Date of mailing Sep. 12, 2008.

Jiang, "Towards Junking the PBX: Deploying IP Telephony", International Workshop on Network and Operating System Support for Digital Audio and Video archive, Proceeding of the 11th international workshop on Network and operating systems support for digital audio and video, Port Jefferson, New York, United States, pp. 177-185—Jun. 21, 2001.

U.S. Appl. No. 11/503,117, filed Aug. 14, 2006, Fisher et al.

"Check Point Fire Wall-1: Extensible Stateful Inspection" Check Point Software Technologies, www checkpoint.com/products/technology/page3 html, 3 P , 1998.

"Vic-Video Conference" http://www archive org/web/19980209092521/mash.cs.berkeley edu/mash , 1998.

Beckman "Netmeter 1 0: See and Hear Your Network" Mac Publishing, L L.C , p. 72, 1996.

McCanne et al Vat-LBNL Audio Conferencing Tool http://www archive.org/web/19980126183021/www-nrg.ee Ibl.gov/vat/, 5 p 1998.

"Player (Player): Syntax", http://www archive.org/web/19980209092521/mash/cs berkely edu/mash. , 3 P , 1998.

Intel Corporation "Intel Internet Video Phone Trail Applet 2 1: The Problem and Pitfalls of Getting H 323 Safety Through Firewalls" http://support intel com/support/videophone/trail21/h323_wpr htm#a 18. 32 P 1997.

Pelletier et al "Netmeeting Through a Packet-Filter", Topic in comp security firewalls, 4 P , 1998.

Eldrige et al. "MS NetMeeting 2 0 and Raptor Eagle Vers 4 0" Topic in muc lists firewalls, 3 P , 1997.

"Communications Solutions: Vendor to Vendor" CTI News, http://www tncnet com/articles/ctimage/0699/0699news htm, 15 P , 1999.

"Breakthrough Internetworking Application for Latency & Loss Measurement From RADCOM" http://www radcom com/radcom/about/pr020999 htm. 2 P , 1997.

"New VoIP Testing Application From RADCOM" http://www radcom.com/radcom/about/pr020999.htm RADCOM Press Releases, 2 P , 1999.

"Protocols Protocols, Protocols", http://www radcom-inc com/protpcol htm, Supported Protocols RADCOM , 10 P , 1998.

"RADCOM Adds UNI 4 0 Signalling and MPEG-II Support to ATM Analysis Solutions" http://www radcom-inc com/press13 htm, 1 P , 1996.

Willis "Voice Over I, The Way It Should Be" WAN System & Telephony, http://www nwc com/1001/1001ws12 html, 5 P , 1999.

"Hear it for Yourself: Audio Samples From Our H 323 Tests" WAN System & Telephony, http://www nwc com/1001/1001ws12 html, 7 P 1999.

"Prism200 Multiport WAN/LAN/ATM Analyzer" RADCOM, http:/www radcom-inc com/pro-pl htrn, 3 P , 1998.

AG Group "EtherPeek for Windows Version 2 0 User's Guide" Eternet Network Analysis Software, UserManual, AG Group, Inc , 169 P., 1989-1997.

Kohlhepp "AG Group Skyline/Satelite Combination Offers Bird's-Eye View of Network Traffic", http://ibg networkcomputing com/612/612skyline html, 7 P , 1995.

"Microsoft RIFF", http://netghost.narod ru/gff/graphics/summary/micriff htm, 5 P , 1996.

"Supported Applications" Check point Software Technologied Ltd , http://www checkpoint com/products/technology/index html, 6 P. 1998.

Waldbusser "RFC 1757—Remote Network Monitoring Management Information Base", http://www faqs org/rfcs/rfc1757 html, 65 P , 1995.

"PrismLite: Portable WAN/LAN/A TM Protocol Analyzer", http://www radcom-inc com/pro-p2 htm, 3 P , 1998.

Simpson "Viewing RTPDump Files", http://bmrc berkeley.edu/-davesimp/veiwingNotes html, 1 P., 1996.

Koyama et al "Personal Multimedia Communication System", Hitachi Rev , 44(4): 207-212, 1995. P.211, r-h Col , 2-P 212, 1-h Col, 1 Fig 6; Claims: A: 2.

Schulzrinne at al. "RFC 1889: RTP: A Transport Protocol for Real-Time Applications" Network Working Group Request for Comments, P 1-38, 1996 02.1-02 3, 05 2, 05 3, Claims: A:127.

Final Office Action for U.S. Appl. No. 12/331,595 dated Mar. 4, 2011.

Audio codes—"SmartWORKS Product Roadmap" Jan. 2005.

Raman Suchitra & Angela Schuett "On-demand Remote Playback" Department of ECCS, University of California Berkeley C5294-7 "CSCW using CSCW" course Project Report, Dec. 1997.

AG Group "About Skyline/Satellite", http://www.aggroup.com/skyline/, Feb. 1998.

Office Action from U.S. Appl. No. 12/331,595 date of mailing Sep. 16, 2010.

* cited by examiner

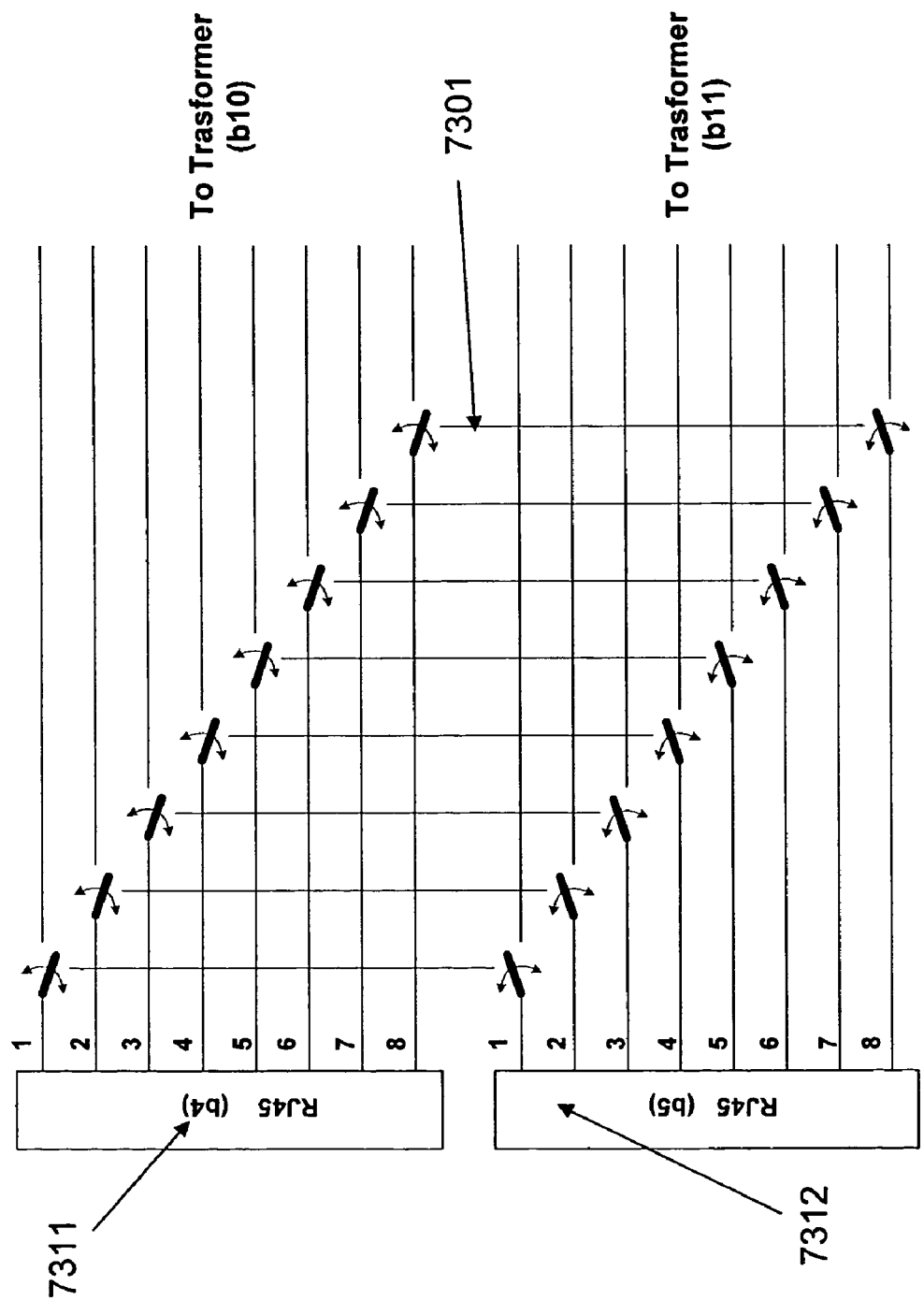

VOICE OVER IP CAPTURING

RELATED APPLICATIONS

The present application is a continuation-in-part of pending U.S. patent application No. 10/913,326, filed on Aug. 9, 2004, which is a continuation of PCT/IL03/00109 filed on Feb. 12, 2003, which claims priority from United Kingdom Patent Application No. 0226384.6 filed on Nov. 12, 2002, which claims priority from U.S Provisional Application No. 60/387,925, filed on Jun. 13, 2002, the contents of which are hereby incorporated by reference.

FIELD AND BACKGROUND OF THE INVENTION

The present invention relates to telephone call capturing and, more particularly, but not exclusively to an apparatus and methods for capturing telephone calls made using voice over internet protocol (VoIP) technologies.

Telephone call recording and monitoring systems are increasingly being used by businesses. For example telephone call recording and monitoring systems may be used for monitoring the effectiveness of agents who receive telephone calls at a calling center.

At present, the dominating telephone call capturing solutions are based on circuit-switched technologies.

Reference is now made to FIG. 1, which is a block diagram illustrating an exemplary current technology based system for capturing phone calls. The system 1000 is applicable to capture of phone calls made using an analog or digital Private Automatic Branch Exchange (PABX) or Public Switched Telephone Network (PSTN).

With system 1000 which is based on current technology, the capturing equipment 110 taps the lines 150 which connect a telephone 120, and an analog or a digital Private Automatic Branch Exchange (PABX) 130 or Public Switched Telephone Network (PSTN), for capturing phone calls.

Such a system is well suited to traditional phone networks. Traditional phone networks are based on circuit switching where a switching loop connection connects the phone 120 and the exchange 130, bi-directionally.

The Voice over Internet Protocol (VoIP) phone service market is growing fast and has become a widespread, popular, and economical alternative to traditional switching loop based telephony networks.

Data networks such as the Internet do not use circuit switching, but are rather based on packet switching. The data networks send and retrieve data on demand. That is to say, instead of routing the data over a dedicated line, data packets flow through a data network along thousands of possible paths. Thus, such communication is relatively diffused evenly across a WAN (wide area network) or LAN (local area network).

VoIP technology capabilities may be used to provide phone service. VoIP has several advantages over circuit switching.

For example, packet switching allows several telephone calls to occupy the amount of space occupied by only one in a circuit-switched network. Each telephone call's data has its own data packets, but all packets are sent through the same network space.

Reference is now made to FIG. 2 which is a block diagram illustrating a VoIP phone connection to a local computer network.

In VoIP phone calls there is no connection to a PABX, instead the phone 210 is connected to an access switch 220, which is a part of the data communication network of an organization.

Existing circuit-switched telephone call recording systems installed in a circuit-switched environment may operate by tapping the extensions or trunks coupled to a circuit-loop switch. Alternatively, the recording system may use the service observation feature of the circuit-loop switch or a dedicated recording connection to observe silently an extension.

Most existing call recording systems are designed for the circuit-switched environment, and are unsuited to VoIP telephony. Existing call recording systems are designed for tapping at the PBX which is a meeting point that all the phone conversation pass through.

Existing VoIP capturing and monitoring systems are typically installed locally, at a central switch of a remote branch of an organization having remote facilities and a central data center.

Current VoIP capturing and monitoring systems depend on the availability of mirroring services (such a switch port analyzer—SPAN or remote switch port analyzer—RSPAN, both offered by Cisco™), or tunneled mirroring sessions (such encapsulated remote switch port analyzer—ERSPAN, to Cisco™) on the switch that the voice over IP capturing system is connected to.

Consequently, current VoIP capturing systems are only suited to certain central switches which support such advanced mirroring session services, and have the intensive CPU resources that the mirroring sessions consume. However, current VoIP capturing systems are unsuited for capturing incoming or outgoing VoIP phone calls directly from a VoIP phone's regular access switch which lacks support for such mirroring sessions.

A locally installed system requires expensive dedicated hardware. Takes up room, costs money and you need enough to cover all possible connection paths. Alternatively, an organization having multiple remote offices may hire dedicated expensive tie lines for sending the audio to be stored at a central location.

There is thus a widely recognized need for, and it would be highly advantageous to have, an apparatus and methods, devoid of the above limitations.

SUMMARY OF THE INVENTION

According to one aspect of the present invention there is provided an apparatus for Voice over IP capturing in a network, comprising: a data receiver, tapping the network and configured to receive at least one data packet transmitted in the network, a VoIP identifier, associated with the data receiver, configured to determine if the received data packet is a VoIP data packet qualifying for forwarding to a capture device, and a forwarder, associated with the VoIP identifier, configured to forward a copy of the qualifying VoIP data packet to at least one capture device, and to forward the received data packets back to the network.

According to a second aspect of the present invention there is provided a system for Voice over IP capturing in a network, comprising: a data receiver, tapping the network and configured to receive at least one data packet transmitted in the network, a VoIP identifier, associated with the data receiver, configured to determine if the received data packet is a VoIP data packet qualifying for forwarding to a capture device, a remote capture device, configured to receive a copy of the qualifying VoIP data packet, and a forwarder, associated with the VoIP Identifier, communicating with the remote capture device, and configured to forward a copy of the qualifying VoIP data packet to the remote capture device.

According to a third aspect of the present invention there is provided a method for Voice over IP capturing in a network, comprising: receiving at least one data packet transmitted in the network by tapping the network, determining if the received data packet is a VoIP data packet qualifying for forwarding to a capture device, forwarding a copy of each of the qualifying VoIP data packets to at least one capture device, and forwarding the received data packets back to the network.

According to a fourth aspect of the present invention there is provided a system for Voice over IP capturing in a network, comprising: a centrally located capture device, configured to receive data packets from remote forwarders, and a plurality of remote forwarders, each one of the remote forwarders being deployed at respective local network locations, the remote forwarder tapping the network and configured to receive at least one data session from the local network and to forward the data session to the centrally located capture device.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof.

For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 7c is a block diagram illustrating a relay connection failure mechanism, implemented in an apparatus for VoIP capturing, according to a preferred embodiment of the present invention.

DESCRIPTION OF THE PREFERRED EMBODIMENTS

Figure 1:
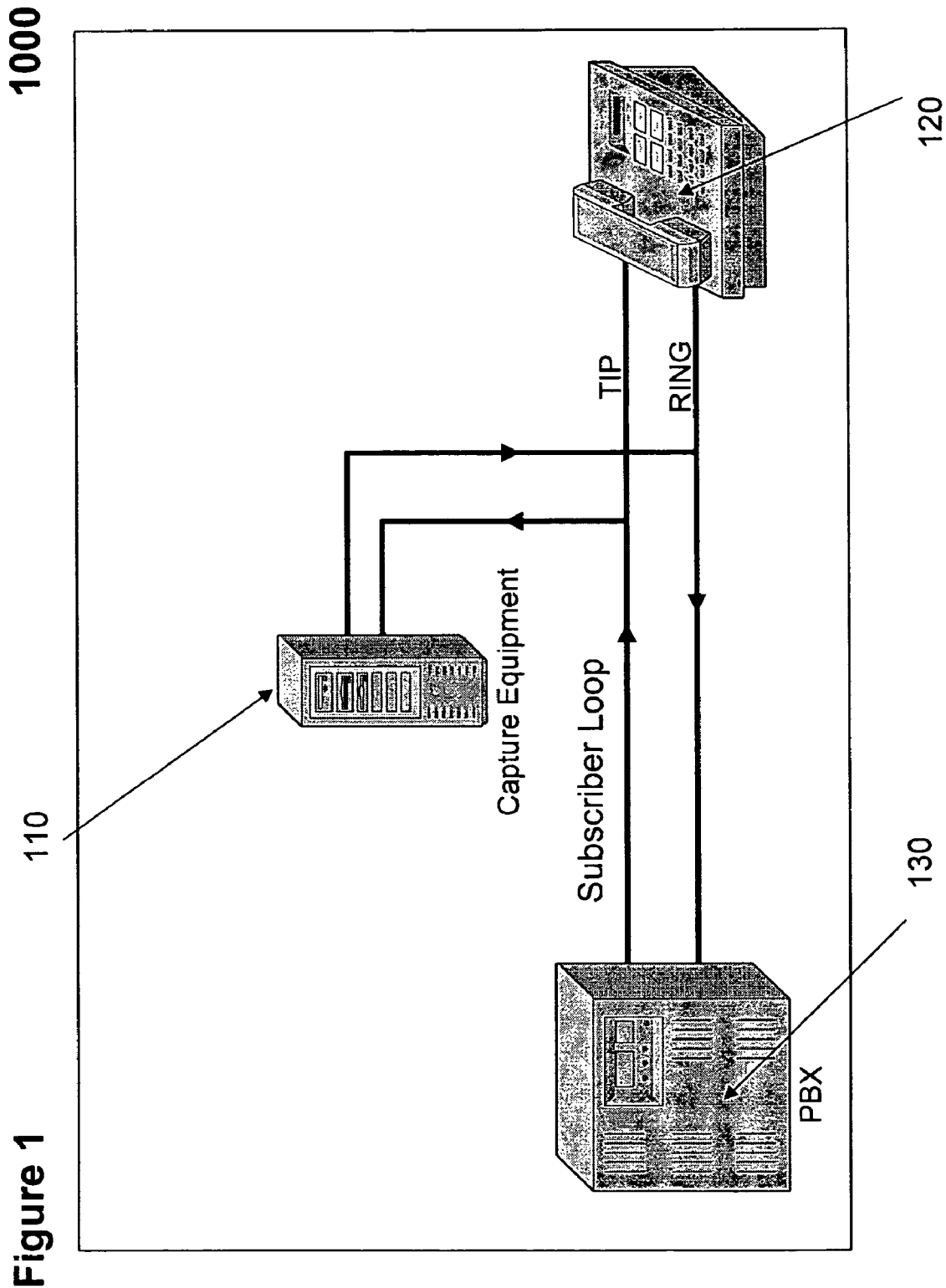
FIG. 1 is a block diagram illustrating an exemplary current technology based system for capturing phone calls.
Figure 2:
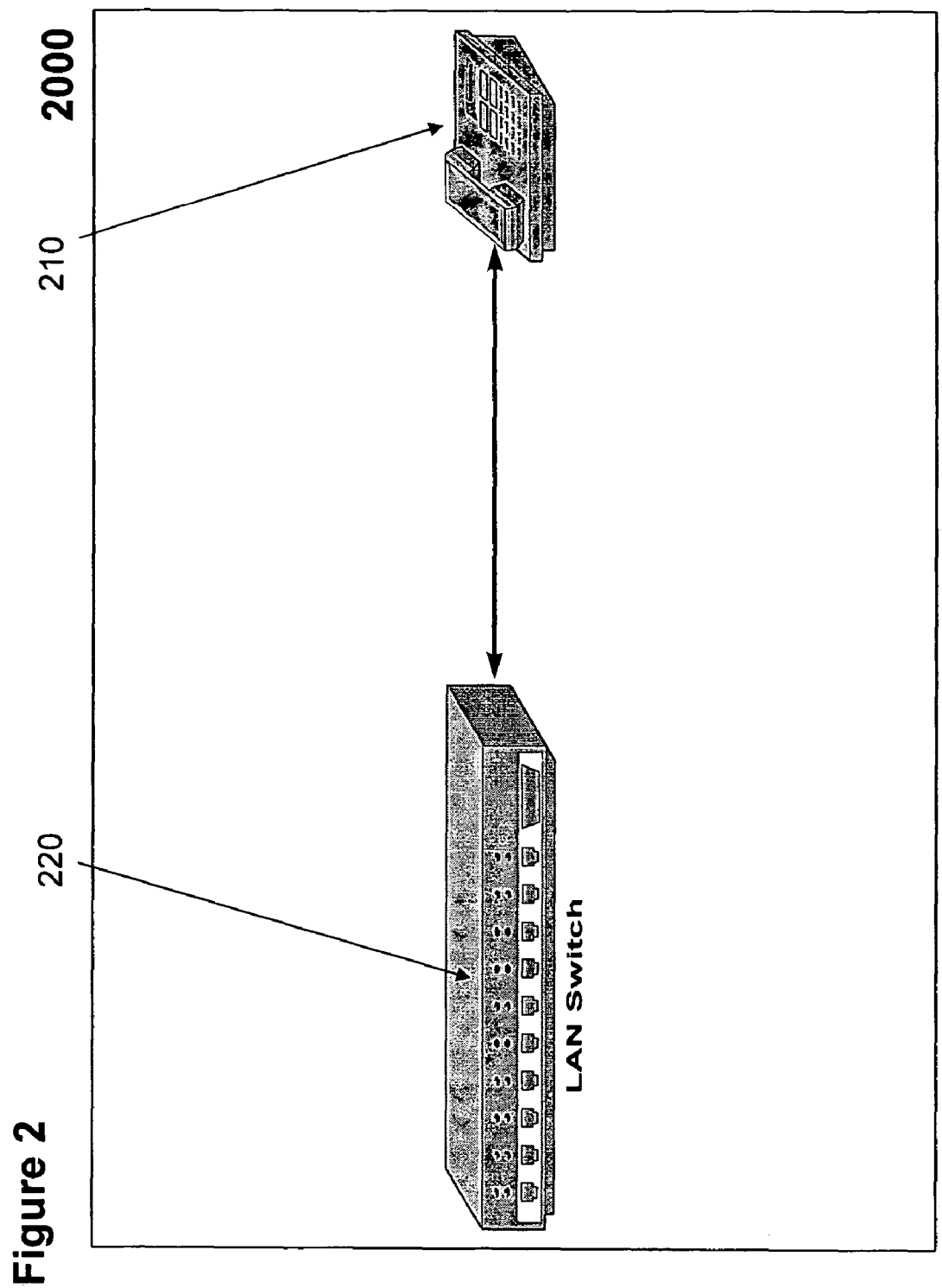
FIG. 2 is a block diagram illustrating a VoIP phone connection to a local computer network.

The present embodiments comprise an apparatus, system, and method for voice over IP capturing in a network.

An apparatus according to a preferred embodiment of the present invention is a network device which is configured to capture communication (voice, video, text, etc) carried over voice over internet protocol (VoIP) data traffic in an internet protocol (IP) network.

The apparatus has a capacity to identify VoIP data packets in among data packets received by the apparatus from the network, where VoIP data packets as well as non-VoIP data packets are transmitted.

The apparatus may then determine, for each of the identified VoIP data packets, if the identified VoIP data packet qualifies for forwarding to a capture device.

The data packets identified as VoIP data packets and found to qualify for forwarding are then forwarded to one or more active capturing devices such as an active recording VoIP logger.

The apparatus is also configured to forward data packets received by the apparatus back to the network.

The forwarding of data packets back to the network allows the deployment of the apparatus in a tapping mode—for tapping a data transmission link in the network, say a specific VoIP telephone branch. The apparatus may also be deployed in a mirroring mode, as explained in further detail herein below.

Furthermore, the apparatus may further include an array of failsafe relays, configured to prevent disconnection in the network link, resultant upon failure of the apparatus (say when the apparatus stops functioning or during a power failure), as described in further detail herein below.

By allowing the deployment of the apparatus in a tapping mode—for tapping a data transmission link, the present invention may be implemented in network where mirroring session services (and tunneled mirroring session services are not supported. The tapping mode further allows the deployment of the apparatus on a simple switch, such as a remote branch access switch used by one or two VoIP telephony device. A VoIP telephony device may include, but is not limited to: a physical phone, a soft phone, a Wi-Fi phone, VoIP enabled Personal Digital Assist (PDA), and any other known in the art device having VoIP capabilities.

That is to say, as VoIP packets of any single phone conversation may be transmitted through different paths of the network, existing VoIP systems have to be installed at each central switch, in a mirroring mode. Utilizing tapping mode deployment of an apparatus according to a preferred embodiment of the present invention, any switch may be tapped for capturing the relevant data packets, as no complicated and resource consuming mirroring sessions are required.

As a result, the present invention may allow a cheaper and more distributable solution to VoIP capturing, specifically for distributed organizations, such as banks, government agencies, etc.

A distributed organization such as a bank typically has dozens, hundreds, or even thousands of branches and one or more central facilities. Each branch and each central facility my have a local computer network and all the local networks are connected together.

With the present invention, VoIP data packets may be intercepted locally, at any relevant communication link, in one of the local networks. The data packets may then be examined with respect to predefined criteria, for determining if the data packets qualify for forwarding to a capture device. The qualifying data packets may then be sent to one or more capture device(s) located at the central facilities of the distributed organization. The capture devices receive the forwarded data packets, process the forwarded data packet, and record the then.

The principles and operation of an apparatus or a system according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 3:
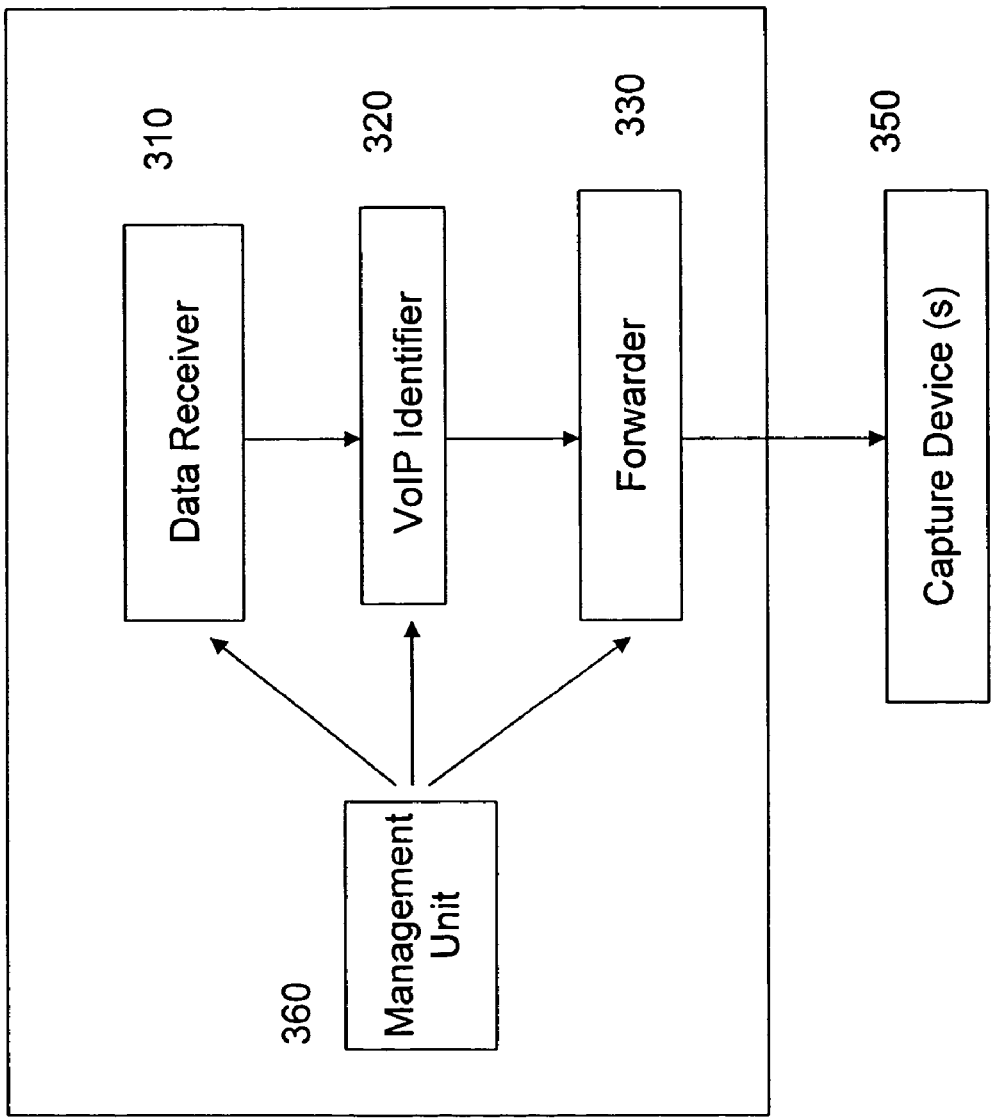
FIG. 3 is a block diagram illustrating an apparatus for voice over IP capturing in a network, according to a preferred embodiment of the present invention.

Reference is now made to FIG. 3, which is a block diagram illustrating an apparatus for voice over IP capturing in a network, according to a preferred embodiment of the present invention.

Apparatus 3000 includes a data receiver 310.

Preferably, the data receiver 310 taps the network. That is to say, the data receiver 310 connects to a line (or a cable) of the network serially. The serial connection may be based on any of the OSI model layers. For example, in layer one of the OSI model, the tapping of the network line is physical, whereas in layer two of the OSI model, the tapping is based on a virtual connection made in a switching component.

The data receiver 310 is configured to receive one or more data packet(s), transmitted in the network. More specifically, the data packet(s) may be data packets, transferred through an Internet protocol (IP) network and intercepted by the data receiver 310.

The apparatus 3000 further comprises a Voice over Internet Protocol (VoIP) identifier 320, connected to the data receiver 310, and configured to determine if a received data packet qualifies for forwarding to a capture device.

The voice over Internet Protocol (VoIP) identifier 320 may identify one or more of the data packets received by the data receiver 310 as a VoIP data packet, as described in further detail herein below.

Optionally, the VoIP identifier 320 deems each identified VoIP data packet qualified for forwarding to a capturing device. Preferably, the VoIP identifier 320 is also configured to determine whether the identified VoIP data packet qualifies for forwarding to a capturing device, according to a user predefined policy, say utilizing data packet classification capabilities or any other method, as described in greater detail herein below.

More preferably, the voice over Internet Protocol (VoIP) identifier 320 is further configured to qualify only VoIP data packets used for implementing a telephony service for forwarding to a capture device.

The apparatus 3000 also includes a forwarder 330, connected to Internet Protocol (VoIP) identifier 320. The forwarder 330 forwards a copy of each data packet, qualified by the VoIP identifier 320, to one or more capture device(s) 350, communicating with the forwarder 330.

Optionally, there are two or more capture device(s) 350, and the VoIP identifier 320 is further configured to select which of the capture device(s) 350 a specific qualified data packet is to be forwarded to, according to a predefined forwarding-policy that may comprise a hash formula, as described in further detail herein below.

According to another preferred embodiment of the present invention, at least one, but optionally and more preferably all of the entities or parties which participate in the recorded/monitored session are able to duplicate the received and sent data, and then to forward the data to the recording/monitoring system. Optionally and preferably, the data is forwarded after only minimal address information is provided and/or changed, such that for example preferably only the destination IP address and port are changed, for example for data that is transmitted as IP packets. Thus, the data is preferably forwarded with minimum pre-processing.

Preferably, the forwarder 330 may also communicate one or more capture device(s) with additional information. The additional information communicated to the capture device(s) by the forwarder 330 may include, but is not limited to: a list of telephony devices accessible to the data receiver 310, the type of communications receivable by the data receiver 310, etc.

Optionally, the forwarder 330 may additionally process the data packet prior to forwarding the data packet. The additional processing carried out by the forwarder, may include, but is not limited to: encrypting the data packet, re-packing the data packet, compressing the data packet, etc.

Preferably, apparatus 3000 further includes a management unit 360. The management unit 360 may be used by the user for configuring the apparatus, monitoring the apparatus, etc.

More preferably, the management unit 360 remotely communicates with the apparatus 30000.

The management unit 360 may be used by the user for defining rules for the VoIP Identifier 320 to follow, for identifying a data packet as a VoIP data packet, for determining if an identified VoIP data packet qualifies for forwarding to a capture device, etc.

Figure 4:
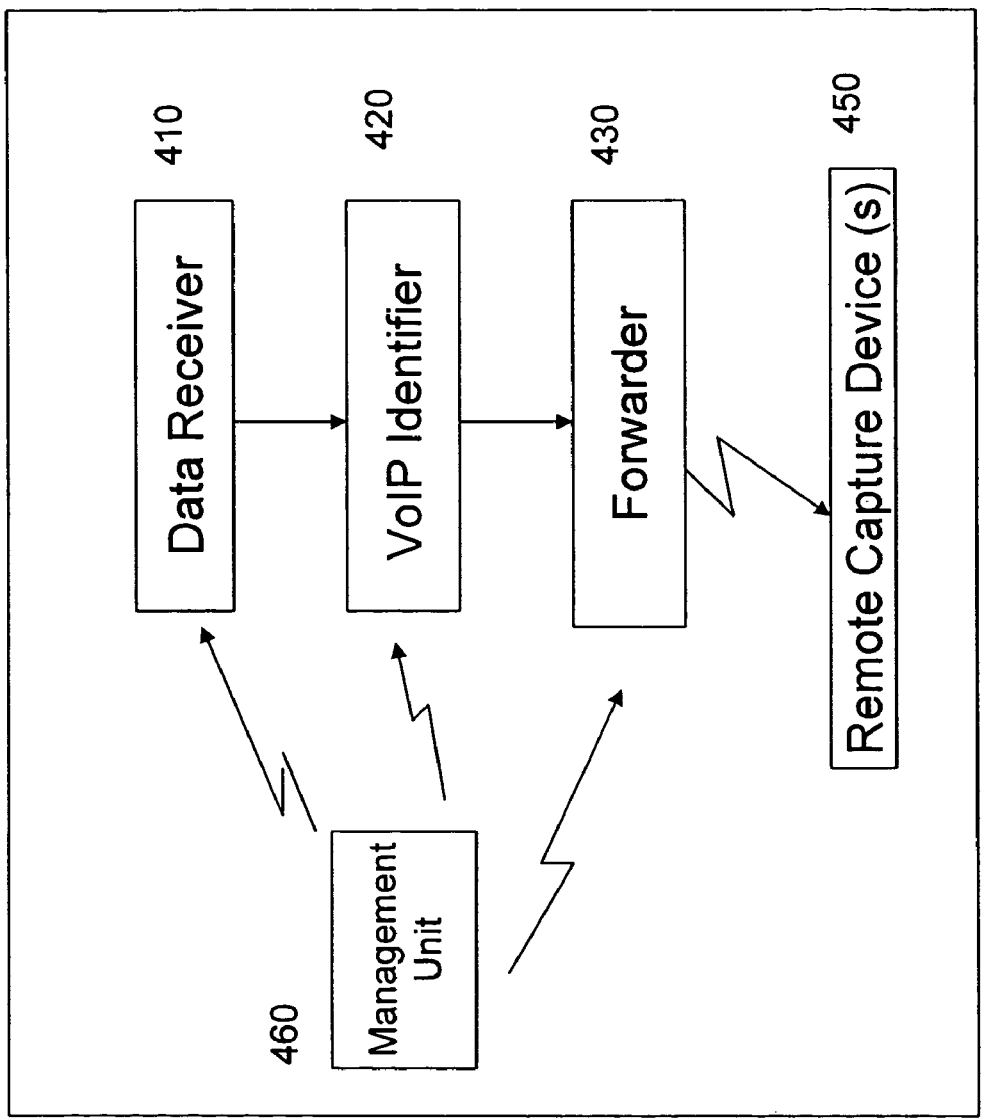
FIG. 4 is a block diagram illustrating a system for voice over IP capturing in a network, according to a preferred embodiment of the present invention.

Reference is now made to FIG. 4 which is a block diagram, illustrating a system for voice over IP capturing in a network, according to a preferred embodiment of the present invention.

System 4000 includes a data receiver 410. The data receiver 410 is configured to receive one or more data packet(s), transmitted in the network. More specifically, the data packet(s) may be data packets, transferred through an Internet protocol (IP) network and intercepted by the data receiver 410, as described hereinabove.

The system 4000 further comprises a Voice over Internet Protocol (VoIP) identifier 420, connected to the data receiver 410.

The voice over Internet Protocol (VoIP) identifier 420 identifies one or more of the data packets received by the data receiver 410 as a VoIP data packet(s), as described in further detail herein below.

Optionally, the VoIP identifier 420 deems each identified VoIP data packet qualified for forwarding to a capturing device.

Preferably, the VoIP identifier 420 also determines whether the identified VoIP data packet qualifies for forwarding to a capturing device, according to a user predefined policy, say utilizing data packet classification capabilities or any other method, as described in greater detail herein below.

More preferably, only VoIP used for implementing a telephony service are found to qualify for forwarding to a capture device.

The system 4000 also includes a forwarder 430, connected to Internet Protocol (VoIP) identifier 420.

The forwarder 430 forwards each data packet, which was found qualifying, utilizing the VoIP identifier 420, to a capture device(s) 450, remotely communicating with the forwarder 430.

Optionally, there are two or more capture device(s) 350, and the VoIP identifier 320 is further configured to select which of the capture device(s) 350 a specific qualified data packet is to be forwarded to, say using a hash formula, as described in further detail herein below.

Preferably, system 400 further includes a remote management unit 460. The management unit 460 may be used by the user for configuring the apparatus, monitoring the apparatus, etc, as described in further detail hereinabove.

Figure 5A:
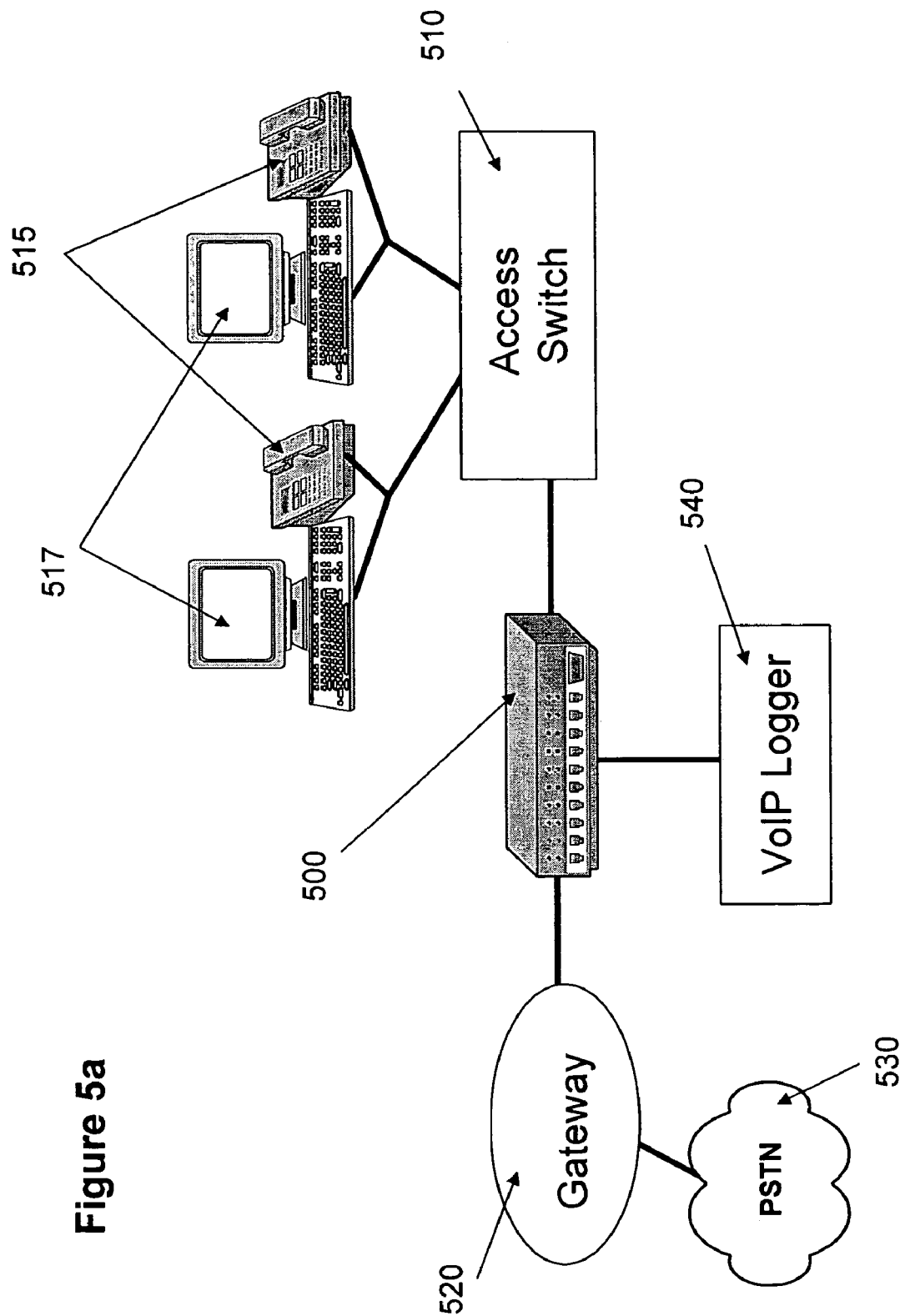
FIG. 5a is a block diagram illustrating an apparatus for voice over IP capturing, connected in a tapping mode, according to a preferred embodiment of the present invention.

Reference is now made to FIG. 5*a* which is a block diagram, illustrating an apparatus for voice over IP capturing, connected in a tapping mode, according to a preferred embodiment of the present invention.

Apparatus 500 taps a communication link between an access switch 510 and a gateway 520 linking the network to a public switching telephony network (PTSN) 530. The access switch 510 connects one or more voice over IP (VoIP) phones 515 via the computers 517 associated with the phones 515.

The apparatus 500, connected in a mode tapping the link between the gateway 520 and the access switch 510, receives all data transmitted between the network and the computers 517.

The apparatus 500 is configured to identify VoIP telephony data packets transmitted through the communication link.

Preferably, the apparatus 500 may be configured to determine, for each identified data packet, whether the identified data packet qualifies for forwarding to a capture device, such as a VoIP logger 540. The decision may be carried out utilizing a variety of criteria, as described in further detail herein below.

The apparatus 500 forwards a copy of each of the qualifying VoIP data packets, to the capture device 540. The apparatus also forwards each data packet received by the apparatus back to the network, thus facilitating a tapping mode without mirroring sessions implemented at the access switch 510.

Preferably, the apparatus 500 also includes a mechanism for securing against disconnection of the tapped line, resultant upon failure of the apparatus 500. The failure may occur when the apparatus 500 stops functioning, during power failure, etc.

For example, the apparatus may include a failsafe relay mechanism for shortening between pairs of lines used by the apparatus 500 for receiving the data packets, as described in further detail herein below.

Figure 5B:
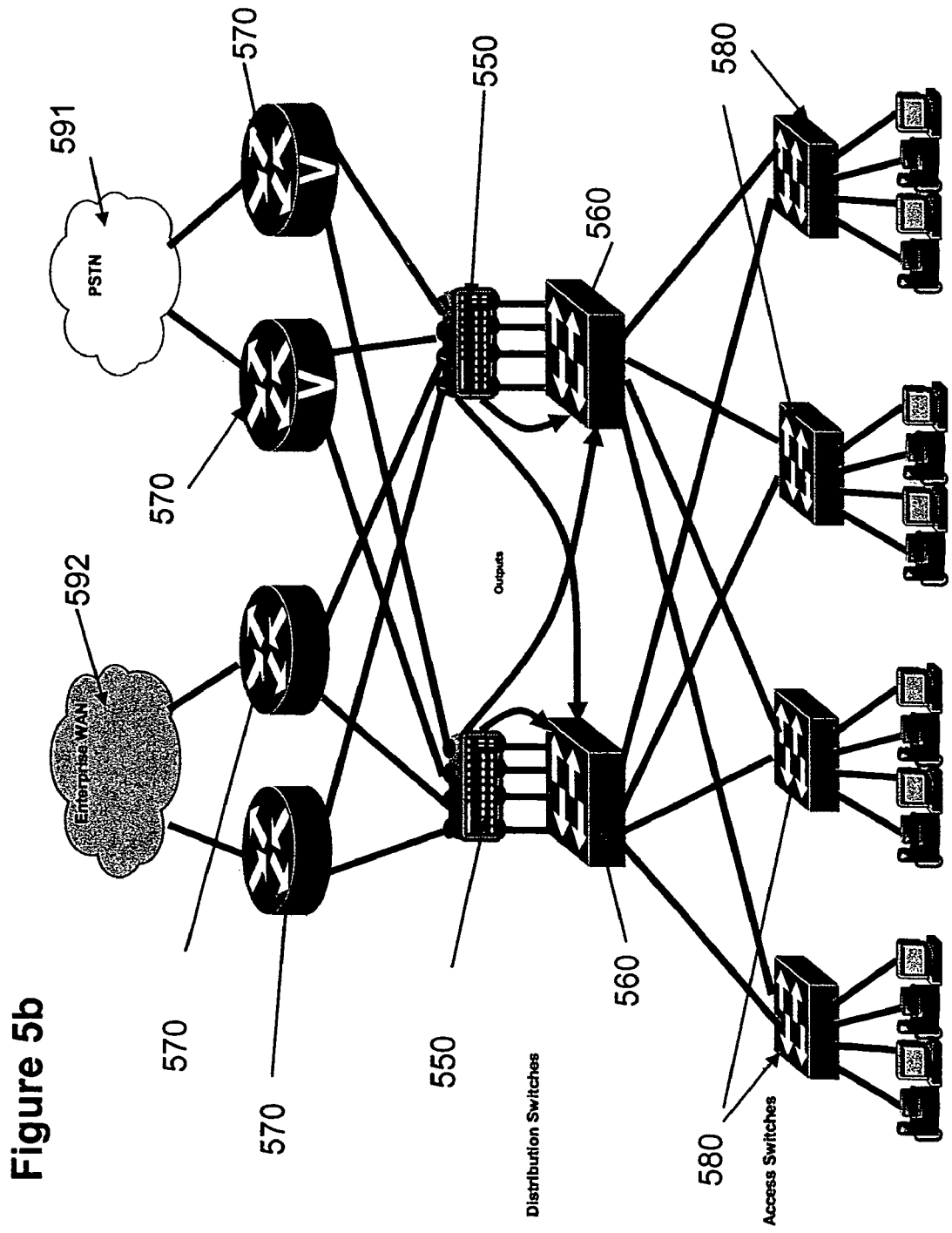
FIG. 5b is a block diagram illustrating a local network installed with apparatuses for voice over IP capturing, according to a preferred embodiment of the present invention.

Reference is now made to FIG. 5*b* which is a block diagram, illustrating a local network installed with apparatuses for voice over IP capturing, according to a preferred embodiment of the present invention.

Apparatuses 550 are deployed in a tapping mode where the apparatuses 550 tap the links between distribution switches 560 and routers 570 in the local network. As a result, all data packets transferred between the distribution switches 560 and routers 570 pass through the apparatuses 550.

The routers 570 link the local network to external networks such as public switching telephony network (PSTN) 591, and a wide area network (WAN) 592. Each distribution switch 560 is typically connected to one or more access switches 580. The access switches 580 are used for connecting VoiP telephones and computers to the local network, for providing VoIP based telephony.

Figure 5C:
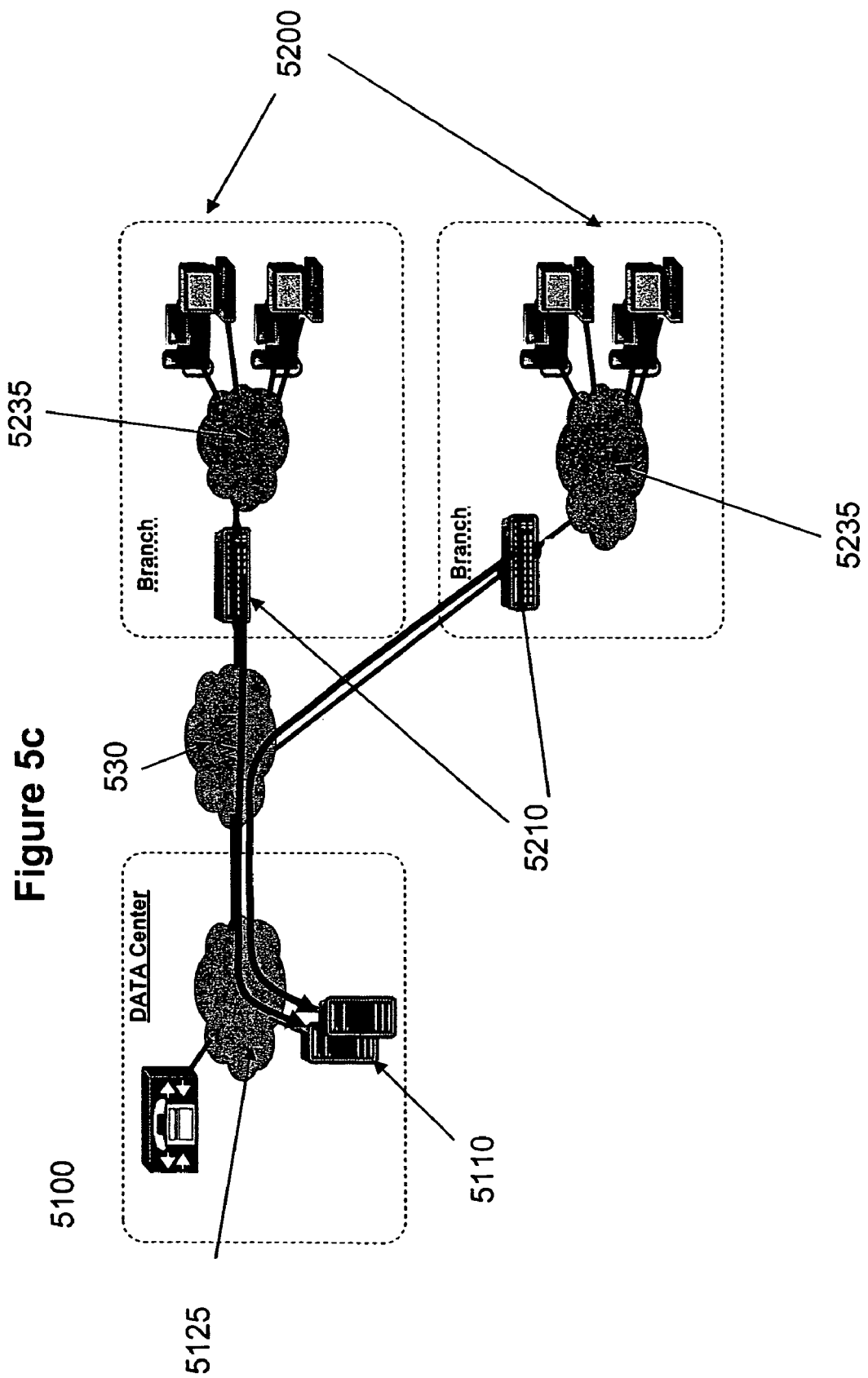
FIG. 5c is a block diagram illustrating distributed network architecture with apparatuses for voice over IP capturing, according to a preferred embodiment of the present invention.

Reference is now made to FIG. 5*c* which is a block diagram, illustrating distributed network architecture with apparatuses for voice over IP capturing, according to a preferred embodiment of the present invention.

A distributed organization (such as a bank, a government agency, etc) has several branches and a central management facility. The organization has a data center 5100 equipped with VoIP loggers 5110, for remotely logging phone calls at the branches 5200 of the organization.

The organization further deploys the apparatuses 5210 for capturing incoming and outgoing VoiP phone calls. The apparatuses 5210 are deployed in a tapping mode, tapping the communication link between each local branch network 5235 and a wide area network (WAN) 5300 connecting the local branch networks 5235 and the local network 5125 at the data center 5100.

The apparatuses 5210 identify VoIP data packets, determining whether the identified units qualify for forwarding, and forward a copy of each qualifying data packet to the loggers at the data center 5100.

Preferably, all data packets received are forwarded back to the network, as described in further detail hereinabove.

Figure 6A:
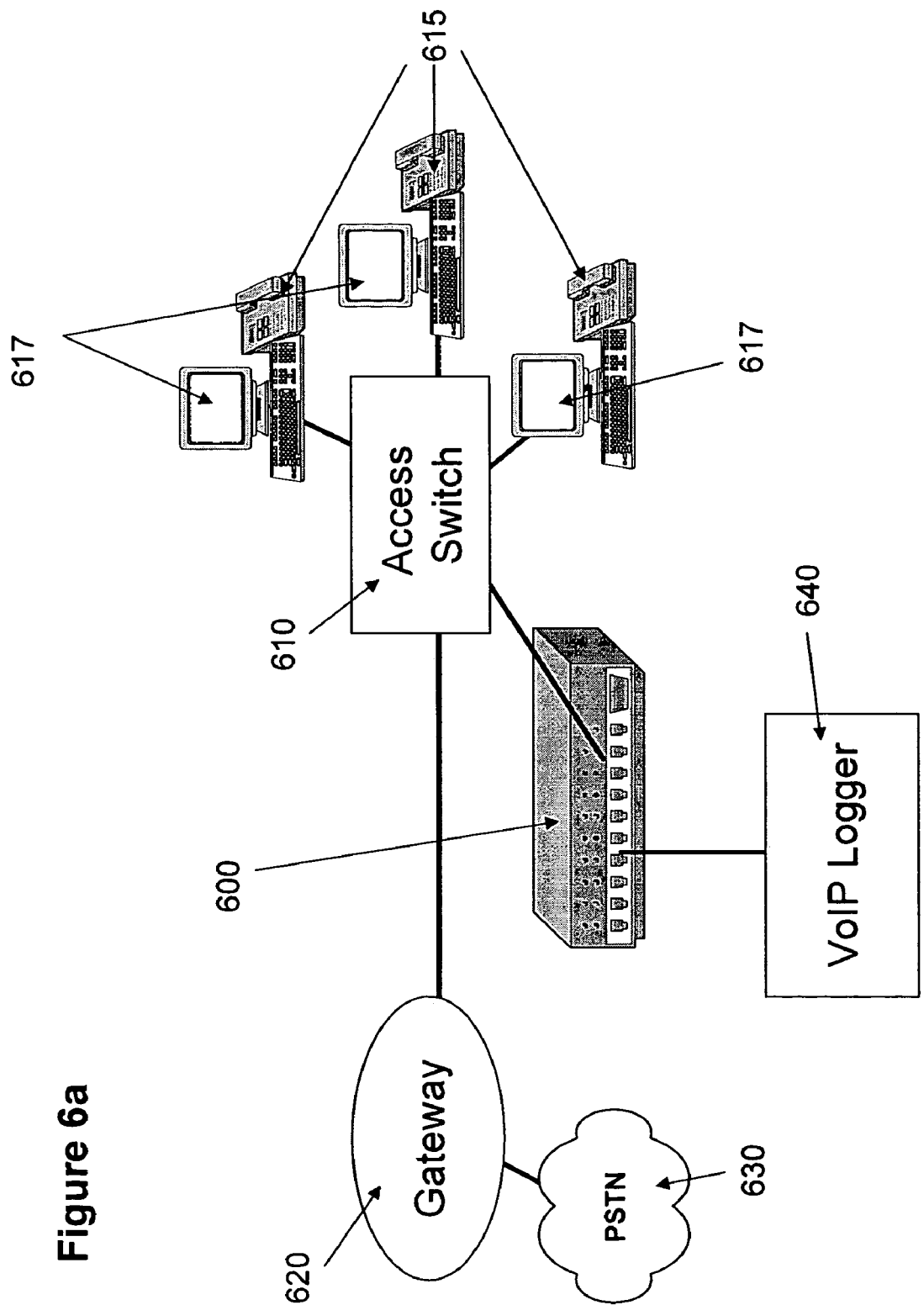
FIG. 6a is a block diagram illustrating an apparatus for VoIP capturing, connected in a mirroring mode, according to a preferred embodiment of the present invention.

Reference is now made to FIG. 6*a* which is a block diagram, illustrating an apparatus for VoIP capturing, connected in a mirroring mode, according to a preferred embodiment of the present invention.

Apparatus 600 is connected to an access switch 610 in a mirroring mode, through mirroring ports on the access switch 610. The access switch supports mirroring sessions which are utilized for VoIP data capturing by the apparatus 600.

The apparatus 600 receives copies of data packets transferred through the switch 610, via the mirroring ports. Preferably, the data transferred through the switch 610, is mirrored such that a copy of each of the transferred data packets is received by the apparatus 600.

The apparatus 600 connects through the mirroring ports, without directly tapping the communication link between the access switch 610 connecting one or more voice over IP (VoIP) phones 615 via the computers 617 associated with the phones 615, and a gateway 620 linking the network to a public switching network (PTSN) 630.

Figure 6B:
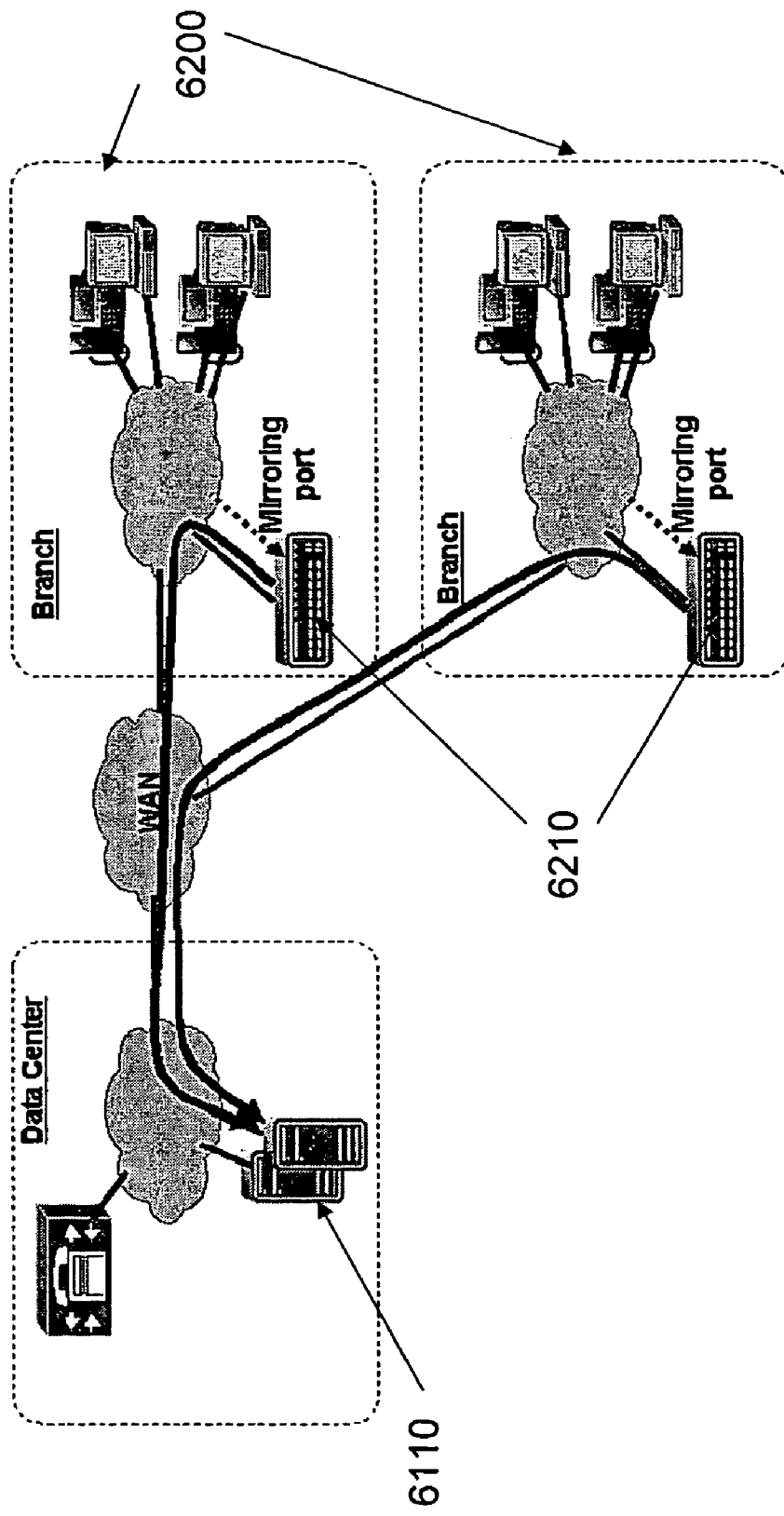
FIG. 6b is a block diagram illustrating a second distributed network architecture with apparatuses for voice over IP capturing, according to a preferred embodiment of the present invention.

Reference is now made to FIG. 6*b* which is a block diagram, illustrating a second distributed network architecture with apparatuses for voice over IP capturing, according to a preferred embodiment of the present invention.

A distributed organization may have a distributed computer network, as illustrated and described in detail hereinabove.

However, the apparatuses 6210 may be installed in a mirroring mode, such that each of the apparatuses 6210 receives a copy of each of the data packets transmitted through a switch, via mirroring ports, as described hereinabove.

The apparatuses 6210 send identified and qualified VoIP data packets to the VoIP loggers 6110, at the data center, as explained in further detail hereinabove.

Figure 7A:
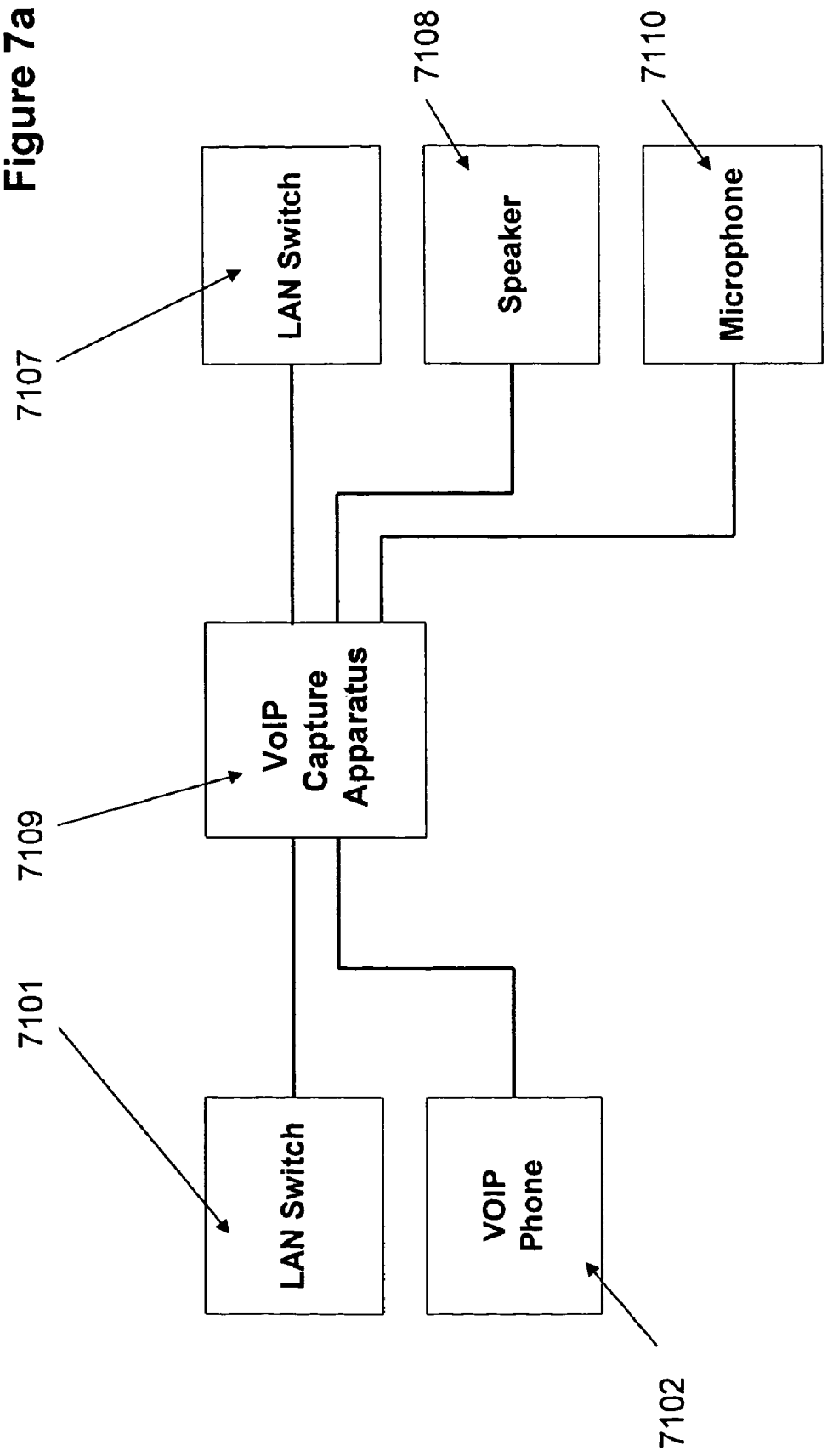
FIG. 7a is a block diagram illustrating an apparatus for voice over IP capturing in a network, with connections and peripheral devices, according to a preferred embodiment of the present invention.

Reference is now made to FIG. 7*a* which is a block diagram, illustrating an apparatus for voice over IP capturing in a network, with connections and peripheral devices, according to a preferred embodiment of the present invention.

An apparatus 7109 is serially connected between a local area network (LAN) Switch 7101 and a VoIP Phone 7102. The apparatus 7109 taps the traffic of data packets that the VoIP phone 7102 receives and transmits, and analyzes the type of each received data packet.

Upon receiving a data packet identified as a RTP data packet (RTP is real-time transport protocol—the Internet-standard protocol for the transport of real-time data including audio and video), the apparatus 7109 forwards the identified RTP data packet to the capture equipment. The forwarding may be done by transmitting the data packet to a LAN Switch 7101, which is also used by the VoIP phone 7102. If the forwarding can not be done on the same Switch 7101 that the VoIP phone uses, the device forwards the identified data packet via another Switch port 7107.

Preferably, the apparatus 7109 further has a capability to receive data packets destined to the phone 7102 and playback the voice data, which is in the data packet, to an external speaker 7108. The device may further have the capability to record voice via a microphone 7110 and send the recorded voice to a desired IP address.

Figure 7B:
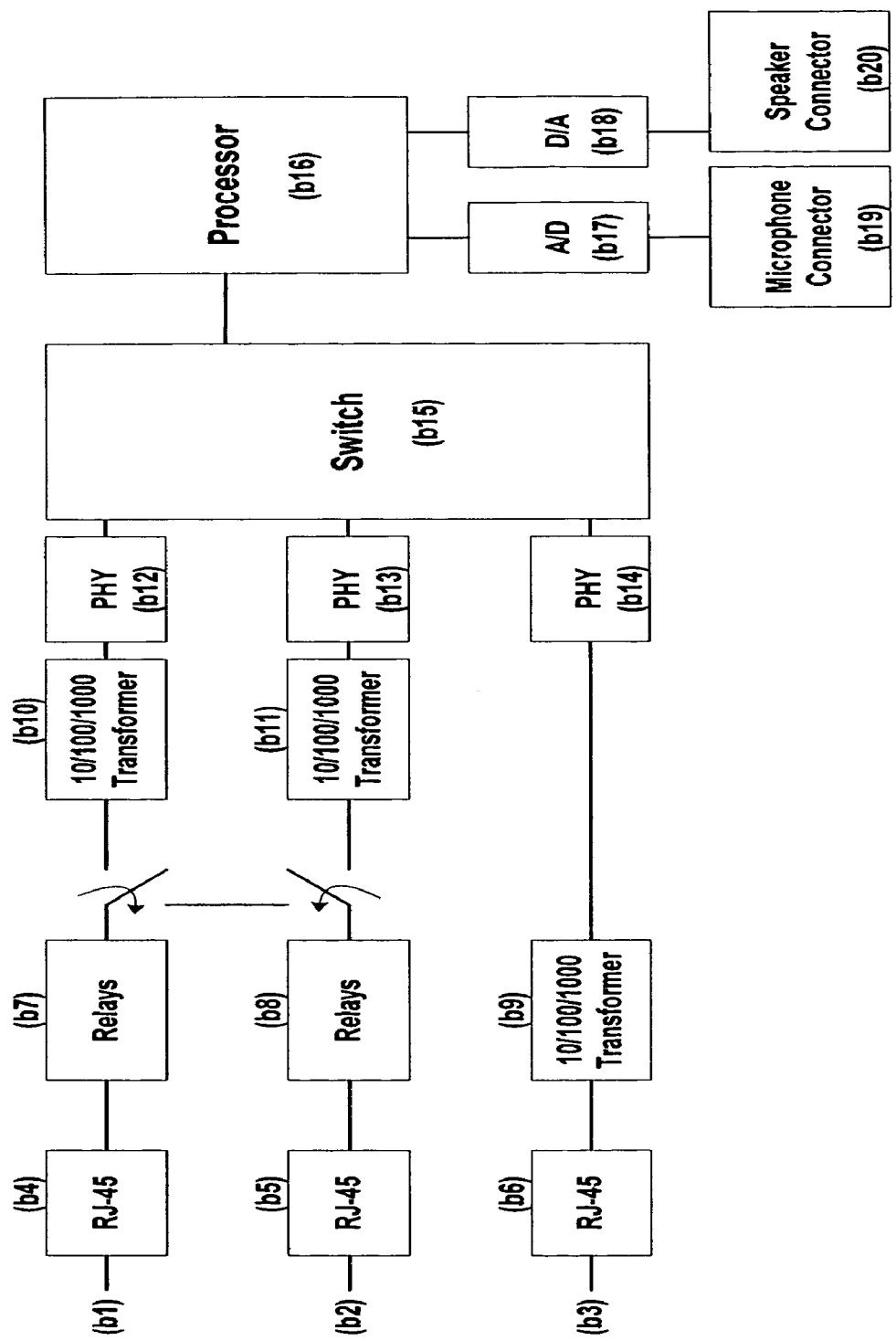
FIG. 7b is a second block diagram, illustrating an apparatus for voice over IP capturing in a network, with connections and peripheral devices, according to a preferred embodiment of the present invention.

Reference is now made to FIG. 7*b* which is a second block diagram, illustrating an apparatus for voice over IP capturing in a network, with connections and peripheral devices, according to a preferred embodiment of the present invention.

FIG. 7*b* depicts in further detail the apparatus and peripherals described hereinabove using FIG. 7*a*.

The LAN Switch port 7101 is connected to a RJ-45 connector b4 via a network cable (b1). The VoIP phone 7102 is connected to a RJ-45 connector (b5) via a network cable (b2). Both connections are routed to Ethernet 10/100/1000 transformers (b10, b11) through relay units (b7, b8).

The relay units (b7, b8) perform a failsafe mechanism which bypasses the device in case of failure. In order to maintain the link between the Switch 7101 and the phone (a2), the relay units (b7, b8) shorten the wires as shown and explained in greater detail, using FIG. 7*c*, herein below.

From the transformers (b10, b11), the two ports are connected to physical links (b12, b13), and then to a switch (b15). The switch (b15) switches the data packets from the LAN switch to both the phone and the processor.

In the other direction, the switch switches the data packets from the phone to both the LAN Switch and the processor (b16). In that way the link between the LAN Switch and the phone is well established, while the processor also receives all the data packets.

The processor (b16) analyzes the units and determines, using pre-defined rules (e.g. according to predefined IP address lists, according to RTP compliance of a data packet, etc.) whether the data packet qualifies for forwarding to the capture equipment.

Data packets that qualify for forwarding are forwarded via the Switch (b15) and port (b1). In case the processor (b16) can not forward the data packets via port (b1), the processor forwards the identified units via port (b3).

The playback capability is provided using a digital-to-analog D/A converters (b18). Similarly, the recording capability is provided using an analog-to digital converter A/D (b17).

Reference is now made to FIG. 7*c* which is a block diagram illustrating a relay connection failure mechanism, implemented in an apparatus for VoIP capturing, according to a preferred embodiment of the present invention.

As described hereinabove, an apparatus according to a preferred embodiment of the present invention may be connected in a tapping mode. In the tapping mode the apparatus taps a communication link in the network, such that all data packets transferred through the communication link are input to the apparatus.

Data packets identified as VoIP data packets and found qualifying, are sent to one or more capture device(s), as described hereinabove. All data packets are forwarded back to the network, thereby facilitating the tapping mode, as explained hereinabove.

However, upon failure of the apparatus, the tapped link may be disconnected. For example—the apparatus may stop functioning, a power failure may occur, etc. In order to avoid such disconnection, the apparatus for VoIP capturing includes a failure mechanism for securing against disconnection of the tapped network link, resultant upon failure of the apparatus.

Preferably, there are two or more input channels used by the apparatus, connected to the network, for receiving the data packets from the network. The apparatus includes one or more one relay devices. Each relay device is configured to connect a pair of the input channels, thereby preventing link disconnection in the network.

In a preferred embodiment of the present invention, each of the input channels comprises a RJ-45 (7311-7312) connector. According to known in the art standards, a RJ-45 connector includes eight pins (1-8).

A failsafe mechanism, according to a preferred embodiment of the present invention, includes an array of relays. When the apparatus fails, the relays arrange such that each pin of one RJ-45 (7311) connector in the pair is connected to a matching pin of the other RJ-45 (7312) connector in the pair.

For example, pin 8 of the RJ-45 (7311) connector electrically connects to pin 8 of the RJ-45 (7312) connector, via a conductive path 7301. However, when the apparatus operates appropriately, a magnetic field powered by the operating apparatus arranges the relays such that the two pins 8 are not connected, but rather each pin electrically connects to one of the transformers (b10, b11).

Figure 8:
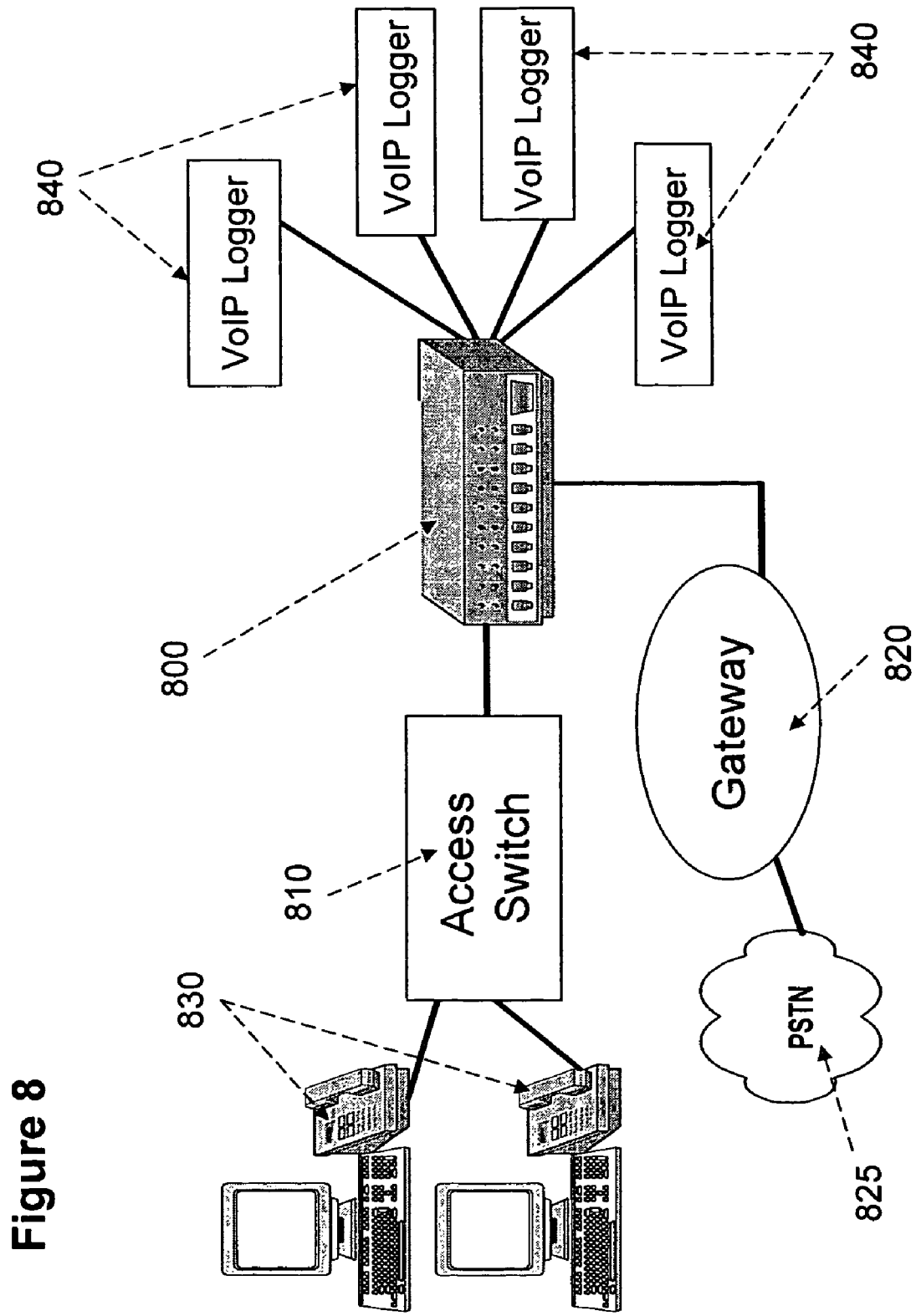
FIG. 8 is a block diagram, illustrating an apparatus for VoIP capturing in network, feeding an array of VoiP loggers, in accordance with a preferred embodiment of the present invention.

Reference is now made to FIG. 8 which is a block diagram, illustrating an apparatus for VoIP capturing in network, feeding an array of VoiP loggers, in accordance with a preferred embodiment of the present invention.

Apparatus 800 taps the communication link between an access switch 810 and gateway 820 connecting the network and a public switched telephony network 825. The access switch 810 is connected to VoIP phones 830.

The apparatus 800 is configured to identify VoIP telephony data packets among the data packets transmitted through the tapped network link and received by the apparatus 800. Preferably, the apparatus 800 identifies the VoIP telephony data packets according to a user pre-definable policy.

Preferably, the apparatus 800 is also configured to determine, for each identified data packet, whether the identified data packet qualifies for forwarding to one of the VoIP loggers 840. The decision may be carried out according to a variety of criteria, as described in further detail herein below.

The apparatus 800 also forwards each of the received data packets back to the network, thus facilitating tapping mode VoIP capturing, as explained in further detail hereinabove.

For each of the VoIP data packets, found to qualify for forwarding to a VoIP logger 840, the apparatus 800 selects one of the loggers 840, and forwards the identified qualifying data packet to the VoIP logger.

Preferably, the selection of a logger among the VoIP loggers 840 is carried out according to a user predefined forwarding-policy. The forwarding-policy may allow load balancing the array of VoIP loggers 840, live back-upping (and recovering), etc. Optionally, the forwarding-policy is based on a hash formula, as discussed in further detail herein below.

Figure 9:
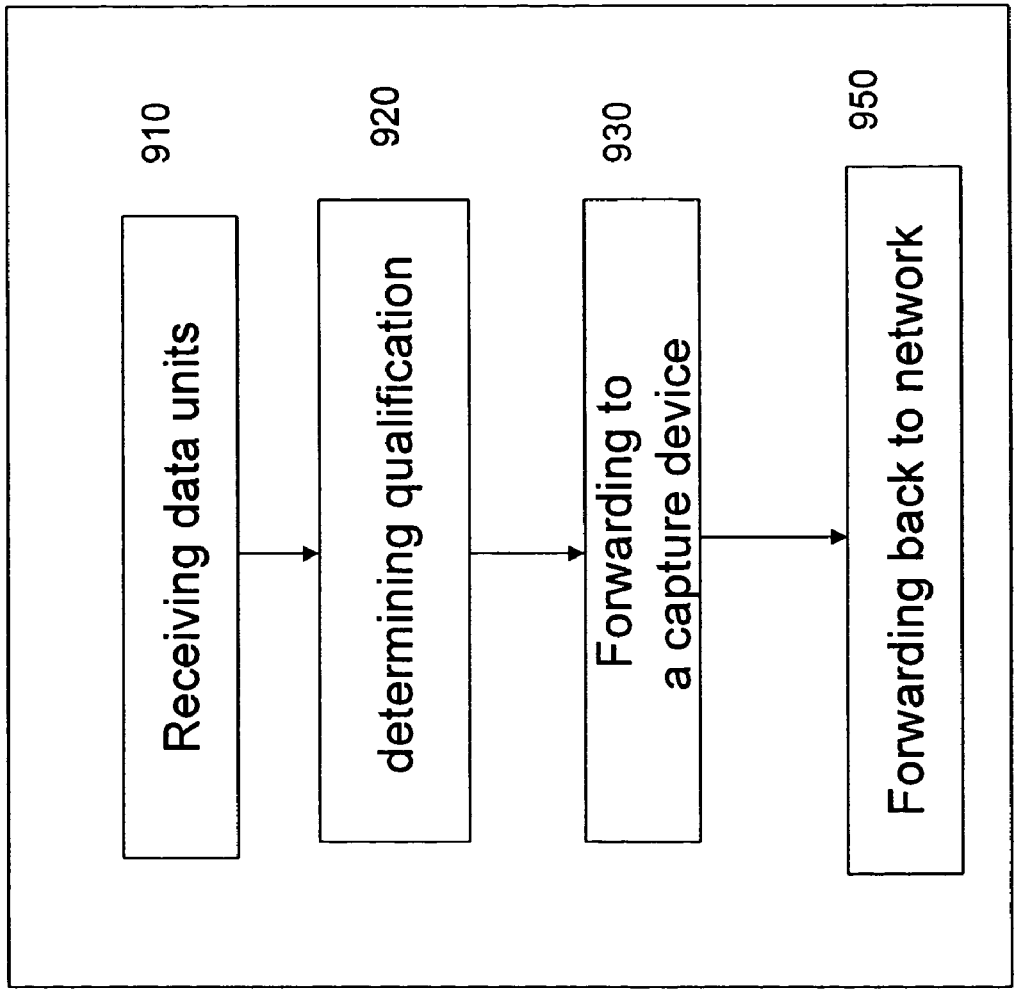
FIG. 9 is a flowchart illustrating a method for VoIP capturing, according to a preferred embodiment of the present invention.

Reference is now made to FIG. 9, which is a flowchart illustrating a method for VoIP capturing, according to a preferred embodiment of the present invention. In accordance with method 9000 for voice over IP capturing in a network, data packets transferred through a communication link in the network are receive 910, say by a data receiver 310, as described hereinabove.

Next each received data packet is examined for determining its qualification for forwarding to a capture device, say by the VoIP identifier 320, as described hereinabove.

Preferably, VoIP data packets are identified among the received data packets. The identified VoIP data packets are examined with respect to predefined criteria, and a decision is made with regards to each of the identified VoIP data packets, whether the specific data packet qualifies for forwarding to a capture device, as discussed in greater detail herein below.

Next, data packets found to qualify for forwarding are forwarded 930 to one or more capture device(s).

Optionally, there may be two or more capture devices and decision is made which of the capture device(s) each specific qualified data packet is sent to, according to a predefined forwarding-policy. The predefined forwarding-policy may be based on a hash formula, or any other criteria, as described in further detail herein below.

Finally, received data packets are forwarded back 950 to the network. The forwarding of received data packets back to the network facilitates tapping mode VoIP capturing, as described in detail hereinabove.

Identifying 920 data packets as VoIP data packets, and determining if the data packets qualify for forwarding to a capture device may be carried out according to predefined rules, the may be based on a variety of criteria, including but not limited to:

A predefined list of IP address.
User Datagram Protocol (UDP)—a communications protocol for the Internet network
Real-time transport protocol (RTP)—the Internet standard protocol for the transport of real-time data including audio and video.
Media type of the data packet.
Transmission Control Protocol (TCP) port number
A predefined list of Media Access Control (MAC) addresses.
Differentiated Services Code Point (DSCP—an integer value encoded in one of the fields of an IP data packet's header) value.
VLAN tag—an Ethernet header extension that enlarges the header from fourteen to eighteen bytes. The VLAN tag contains the VLAN ID and priority.
Computer Telephony Integration (CTI) data
A type of a protocol implemented in the data packet
Any other of the fields in the header of the data packet.
Or any other information residing in the packet According to a preferred embodiment of the present invention, the data packets are identified as VoIP data packets, according to general criteria.

For example, the data packets may be identified as VoIP data packets based on compliance with a standard such as the User Datagram Protocol (UDP) or the Real-time transport protocol (RTP), say by the VoIP identifier 320, as described hereinabove.

Optionally, each data packet identified as a VoIP data packet qualifies for forwarding to a capture device, such as a VoiP logger.

Preferably, a decision is then made, with respect to each data packet identified as a VoIP data packet, based on more specific criteria, if the data packet qualifies for forwarding to a capture device.

For example, a list of IP (or MAC) addresses may be predefined by a user, and only identified VoiP data packets bearing one of the addresses, as a destination or as an origin, are found to qualify for forwarding to a capture device such as a VoIP logger.

According to a preferred embodiment of the present invention, there are two or more capture devices such as VoiP loggers, and one of the capture devices is selected for receiving each specific qualified data packet, say by the VoIP identifier 320, as described hereinabove. Preferably, the selection of the receiving capture device is carried out according to a predefined forwarding-policy.

Preferably, the selection of the capture device is carried out according to a forwarding-policy based on a hash formula, such that the qualified data packets are uniformly distribution among the capture devices. As a result, there is achieved load balancing among the capture devices.

Using the hash formula based forwarding-policy, the load balancing is achieved with minimum configuration effort by a user of an apparatus for VoiP capturing, as described hereinabove.

The hash formula may a mathematical formula which when applied on predefined fields of the data packet produces a value identifying one of the capture devices, such that a uniform distribution of such values is achieved for the many data packets received and qualified for forwarding.

Preferably, each data packet may be forwarded to two of the capture devices, thereby providing a live baking-up scheme for all qualified data packets.

Preferably, there may be at least two possible architectures for implementing an apparatus according to preferred embodiments of the present invention: a High-end architecture and a low-end architecture. Each of the architectures involves connecting the apparatus 3000 to the network in a tapping mode, or in a mirroring mode.

The main difference between the solutions is in the binding point, as described herein below.

The high-end architecture is tailored for a case where a large number of VoIP phones are to be forwarded to the VoIP Logger. The binding point for the high-end may be between any network components as depicted in FIGS. 5a, 5b and 5c for tapping and 6a, 6b and 6c for mirroring, hereinabove.

Figure 10:
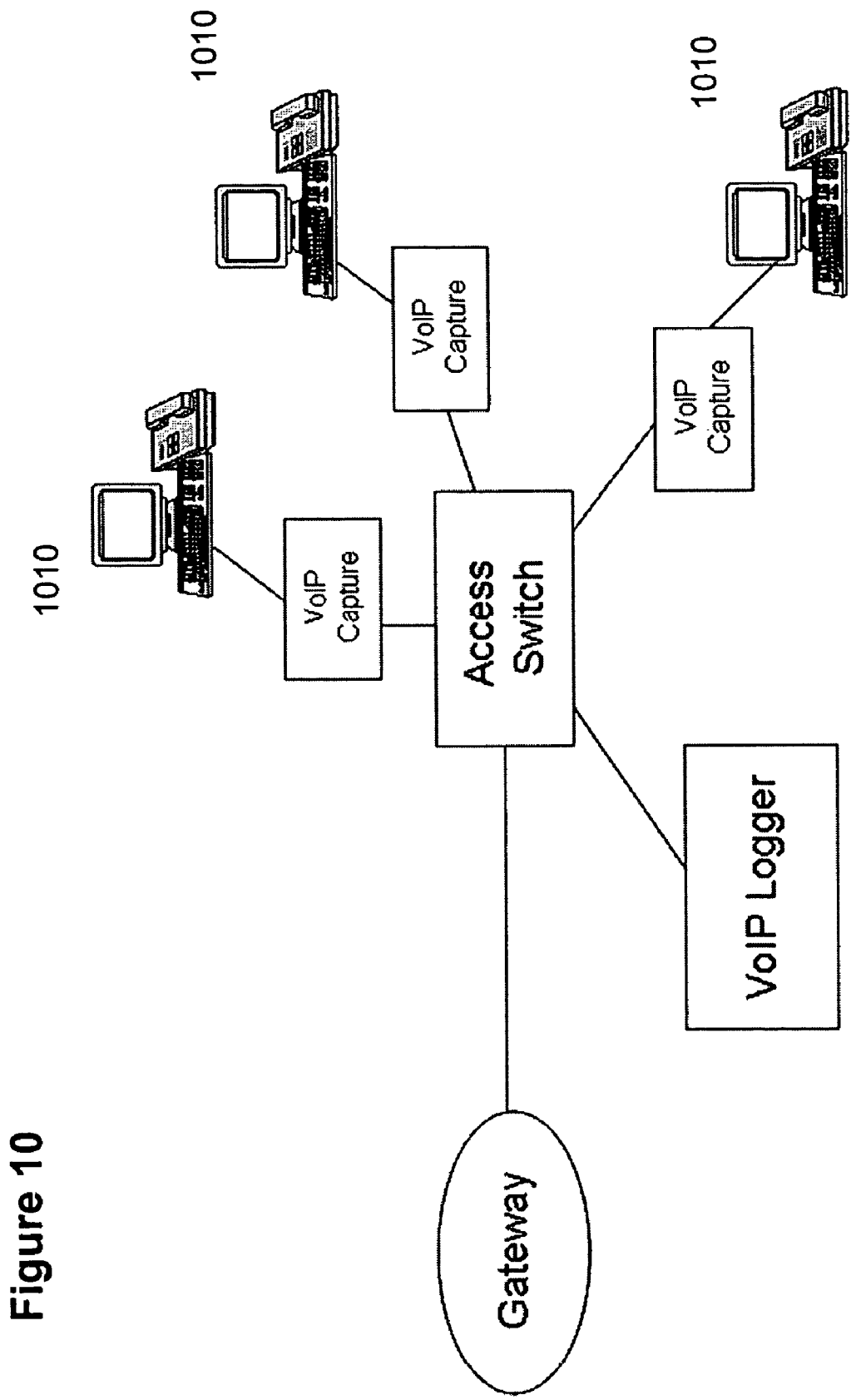
FIG. 10 is a block diagram illustrating a low end architecture for VoIP capturing, according to a preferred embodiment of the present invention.

Reference is now made to FIG. 10 which is a block diagram illustrating a low end architecture for VoIP capturing, according to a preferred embodiment of the present invention.

The low-end architecture is tailored for a case where a small number of VoIP phones 1010 are to be forwarded or where the high-end architecture can not be implemented in the network. The binding point for the low-end is between an access switch 1020 and a VoIP phone 1010 or computer. FIGS. 7a, 7b and 7c may serve to illustrate possible apparatuses and mechanisms, usable for implanting the low end architecture.

It is expected that during the life of this patent many relevant devices and systems will be developed and the scope of the terms herein, particularly of the terms "data packet" and "data packet", "VoiP phone", "access switch", "cable", and "protocol" is intended to include all such new technologies a priori.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. An apparatus for Voice over IP capturing in a network, the apparatus comprising:
   a data receiver, tapping the network, and configured to receive data packets transmitted over a communication link between a first party and a second party coupled to the network;
   a VoIP identifier configured to determine if received data packets are Real-time transport protocol (RTP) VoIP data packets based on compliance with a known standard of the RTP and if the VoIP data packets are qualified for forwarding to a recording device based on Computer Telephony Integration (CTI) data; and
   a forwarder configured to change a destination IP address and port of a copy of qualified RTP VoIP data packets and to forward the copy of qualified RTP VoIP data packets to the recording device via a first switch port external to the apparatus, and to forward the received data packets back to the network via a second switch port external to the apparatus.

2. The apparatus of claim 1, wherein said VoIP identifier is further configured to find only a data packet used for implementing a VoIP telephony service qualifying for forwarding to the recording device.

3. The apparatus of claim 1, wherein said VoIP identifier is further configured to select said recording device from a plurality of recording devices according to a predefined forwarding-policy.

4. The apparatus of claim 1, wherein said receiver is further configured to receive said data packets directly from a VoIP telephony device.

5. The apparatus of claim 1, wherein said VoIP identifier is further configured to determine if a data packet is a VoIP data-packet qualifying for forwarding according to at least one predefined rule.

6. The apparatus of claim 1, wherein said VoIP identifier is further configured to find each of said received VoIP data packets qualifying for forwarding to the recording device.

7. The apparatus of claim 1, wherein said VoIP identifier is configured to determine if a received data packet is a data packet qualifying for forwarding to a capture device according to a predefined list of Media access Control (MAC) addresses.

8. The apparatus of claim 1, wherein said VoIP identifier is further configured to determine if a received data packet is a data packet qualifying for forwarding to a capture device according to a predefined list of Internet Protocol (IP) addresses.

9. The apparatus of claim 1, wherein said VoIP identifier is configured to determine if a received data packet is a data packet qualifying for forwarding to a capture device, by detecting implementation of a predefined protocol in said received data packet.

10. The apparatus of claim 1, further comprising:
    a relay device having a first relay unit for connecting the first party via a first channel and a second relay unit for connecting the second party via a second channel wherein the relay device is configured to enable the VoIP data packets to bypass the apparatus in case of a failure so as to maintain the connection of the link by electrically connecting the first channel and the second channel.

11. The apparatus of claim 1, wherein the forwarder is configured to forward to the recording device a list of devices accessible to the receiver.

12. A system for Voice over IP capturing in a network, the system comprising:
    a remote recording device coupled to the network; and
    an apparatus comprising:
    a data receiver, tapping the network, and configured to receive data packets transmitted over a communication link between a first party and a second party coupled to the network;
    a VoIP identifier configured to determine if received data packets are Real-time transport protocol (RTP) VoIP data packets based on compliance with a known standard of the RIP and if the VoIP data packets are qualified for forwarding to the remote recording device based on Computer Telephony Integration (CTI) data; and
    a forwarder communicating with said remote recording device, and configured to change a destination IP address and port of a copy of qualified RTP VoIP data packets and to forward the copy of qualified RTP VoIP data packets via a first switch port external to the apparatus to said remote recording device, and to forward the received data packets back to the network via a second switch port external to the apparatus.

13. The system of claim 12, wherein said VoIP identifier is further configured to find only a VoIP data packet used for implementing a VoIP Telephony Service qualifying for forwarding to the recording device.

14. The system of claim 12, further comprising a plurality of additional remote recording devices, wherein said forwarder is further configured to send a copy of said qualified VoIP data packets to said recording devices, and said VoIP identifier is further configured to select one of said recording devices according to a predefined forwarding-policy.

15. A method for Voice over IP capturing in a network, the method comprising:
    receiving packets transmitted over a communication link between a first party and a second party coupled to the network, by an apparatus tapping the communication link;
    determining if received data packets are Real-time transport protocol (RTP) VoIP data packets based on compliance with a known standard of the RTP and if the VoIP data packets are qualified for forwarding to a recording device according to Computer Telephony Integration (CTI) data;
    changing destination IP address and port of a copy of qualified RTP VoIP data packets;
    forwarding the copy of qualified RTP VoIP data packets to the recording device via a first switch port external to the apparatus; and
    forwarding said received data packets back to the network via a second switch port external to the apparatus.

16. The method of claim 15, wherein only a data packet used for implementing a VoIP Telephony Service is found to qualify for forwarding to the recording device.

17. The method of claim 15, further comprising selecting the recording device from a plurality of recording devices according to a predefined forwarding-policy.

18. The method of claim 15, further comprising receiving said data packets directly from a VoIP telephony device.

19. The method of claim 15, wherein said determining if said received data packets qualifies for forwarding to the recording device is carried out according to at least one predefined rule.

20. The method of claim 15, further comprising finding each VoIP data packet qualifying for forwarding to a capture device.

21. The method of claim 15 further comprising determining if a received data packet is a data packet qualifying for forwarding to a capture device according to a predefined list of Median access Control (MAC) addresses.

22. The method of claim 15 further comprising determining if a received data packet is a data packet qualifying for forwarding to a capture device according to a predefined list of Internet Protocol (IP) addresses.

23. The method of claim 15, wherein said determining if a received data packet is a data packet qualifying for forwarding to a capture device is carried out by detecting implementation of a predefined protocol in said received data packet.

24. The method of claim 15, wherein the apparatus comprises a relay device having a first relay unit for connecting the first party via a first channel and a second relay unit for connecting the second party via a second channel and upon detection of a failure of the apparatus, the method further comprises:
    electrically connecting the first channel and the second channel to enable the VoIP data packets to bypass the apparatus so as to maintain the connection of the communication link.

25. The method of claim 15, comprising forwarding to the recording device a list of accessible devices.

* * * * *